(12) United States Patent
Nakano et al.

(10) Patent No.: US 8,698,715 B2
(45) Date of Patent: Apr. 15, 2014

(54) DISPLAY DEVICE AND METHOD FOR MANUFACTURING THE SAME

(75) Inventors: Shinichi Nakano, Osaka (JP); Akio Miyata, Osaka (JP); Tomoko Teranishi, Osaka (JP); Toshiki Matsuoka, Osaka (JP); Kazuhiro Deguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 985 days.

(21) Appl. No.: 12/746,354

(22) PCT Filed: Aug. 7, 2008

(86) PCT No.: PCT/JP2008/064207
§ 371 (c)(1),
(2), (4) Date: Jun. 4, 2010

(87) PCT Pub. No.: WO2009/072323
PCT Pub. Date: Jun. 11, 2009

(65) Prior Publication Data
US 2010/0271352 A1 Oct. 28, 2010

(30) Foreign Application Priority Data
Dec. 7, 2007 (JP) .................................. 2007-317440

(51) Int. Cl.
*G09G 3/36* (2006.01)

(52) U.S. Cl.
USPC ............... 345/87; 345/88; 345/104; 345/204; 345/690; 349/127

(58) Field of Classification Search
USPC .................... 345/55, 61, 72, 87, 88, 93, 104, 345/204–206, 211–213, 690; 349/127
See application file for complete search history.

(56) References Cited

U.S. PATENT DOCUMENTS

| 5,757,345 A | 5/1998 | Sheridon |
| 7,843,545 B2 * | 11/2010 | Jung et al. ..................... 349/149 |
| 2004/0196525 A1 * | 10/2004 | Fujii et al. ..................... 359/245 |
| 2007/0040982 A1 * | 2/2007 | Nakano et al. ............... 349/149 |
| 2007/0182891 A1 | 8/2007 | Toyoda |
| 2009/0059348 A1 * | 3/2009 | Niwano et al. ............... 359/296 |

FOREIGN PATENT DOCUMENTS

| JP | 10-39800 A | 2/1998 |
| JP | 2004-252444 A | 9/2004 |
| JP | 2006-113369 A | 4/2006 |

* cited by examiner

*Primary Examiner* — Jennifer Nguyen
(74) *Attorney, Agent, or Firm* — Birch, Stewart, Kolasch & Birch, LLP

(57) ABSTRACT

A display device (10) includes an upper substrate (first substrate) (2), a lower substrate (second substrate) (3), and a conductive liquid (16) that is movably sealed in a display space (S) formed between the upper substrate (2) and the lower substrate (3). In the display device (10), an electrode member (f) for filling the conductive liquid (16) is provided in the display space (S) and configured so that a predetermined voltage can be applied thereto, and the conductive liquid (16) is filled in the display space (S) by applying the predetermined voltage to the electrode member (f).

20 Claims, 12 Drawing Sheets

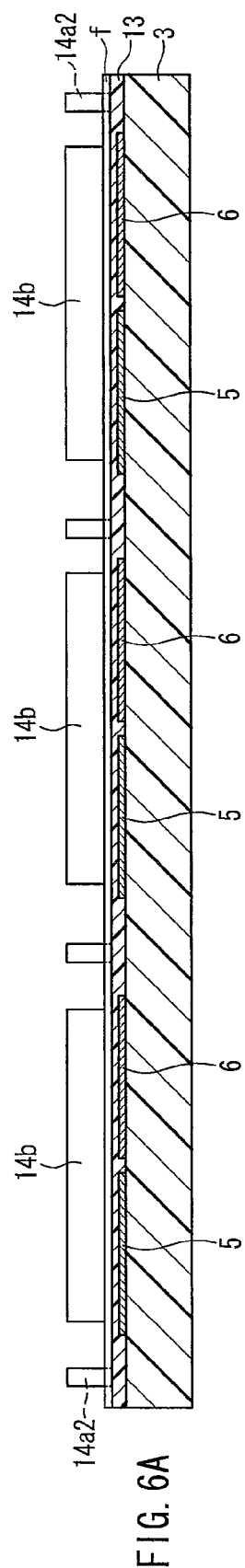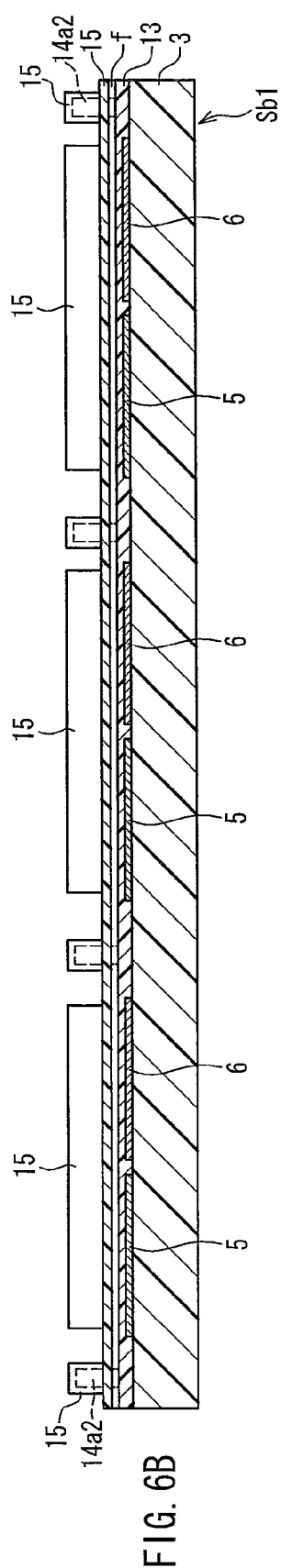

DISPLAY DEVICE AND METHOD FOR MANUFACTURING THE SAME

TECHNICAL FIELD

The present invention relates to a display device that displays information such as images and characters by moving a conductive liquid, and a method for manufacturing the display device.

BACKGROUND ART

In recent years, as typified by an electrowetting type display device, a display device that displays information by utilizing a transfer phenomenon of a conductive liquid due to an external electric field has been developed and put to practical use.

Specifically, such a conventional display device includes first and second electrodes, first and second substrates, and a colored droplet that is sealed in a display space formed between the first substrate and the second substrate and serves as a conductive liquid that is colored a predetermined color (see, e.g., JP 2004-252444 A). In this conventional display device, a voltage is applied to the colored droplet via the first electrode and the second electrode to change the shape of the colored droplet, thereby changing the display color on a display surface.

For the above conventional display device, another configuration also has been proposed, in which the first electrode and the second electrode are arranged side by side on the first substrate and electrically insulated from the colored droplet, and a third electrode is provided on the second substrate so as to face the first electrode and the second electrode. Moreover, a light-shielding shade is provided above the first electrode. Thus, the first electrode side and the second electrode side are defined as a non-effective display region and an effective display region, respectively. With this configuration, a voltage is applied so that a potential difference occurs between the first electrode and the third electrode or between the second electrode and the third electrode. In this case, compared to the way of changing the shape of the colored droplet, the colored droplet can be moved toward the first electrode or the second electrode at a high speed, and thus the display color on the display surface can be changed at a high speed as well.

DISCLOSURE OF INVENTION

Problem to be Solved by the Invention

However, in the above conventional display device, the conductive liquid cannot be easily filled into the display space. Therefore, it is difficult to improve the productivity of the display device. The size of the display space is generally about 1 to 2 mm$^3$. For the conventional display device, e.g., about 0.3 μL of the conductive liquid needs to be appropriately filled into such a small space. This operation requires an enormous amount of time and manpower. Consequently, the productivity of the conventional display device is not likely to be improved.

With the foregoing in mind, it is an object of the present invention to provide a display device that has high productivity and allows the conductive liquid to be easily filled into the display space, and a method for manufacturing the display device.

Means for Solving Problem

To achieve the above object, a display device of the present invention includes the following: a first substrate provided on a display surface side; a second substrate provided on a non-display surface side of the first substrate so that a predetermined display space is formed between the first substrate and the second substrate; and a conductive liquid movably sealed in the display space. The display device is capable of changing a display color on the display surface side by moving the conductive liquid. An electrode member for filling the conductive liquid is provided in the display space and configured so that a predetermined voltage can be applied thereto. The conductive liquid is filled into the display space by applying the predetermined voltage to the electrode member.

In the above display device, the electrode member is provided in the display space, and the conductive liquid is filled into the display space by applying the predetermined voltage to the electrode member. With this configuration, unlike the conventional example, the conductive liquid can be easily sealed in the display space, and the productivity of the display device can be improved.

In the above display device, it is preferable that an electrode for moving the conductive liquid in the display space is provided on one of the first substrate and the second substrate so as to be electrically insulated from the conductive liquid and the electrode member, and that the conductive liquid is filled into the display space by applying the predetermined voltage to the electrode member so that a predetermined potential difference occurs between the electrode member and the electrode.

In this case, an electrowetting phenomenon can occur between the electrode member and the electrode. Therefore, the conductive liquid can be held on one of the first and second substrates and reliably filled into the display space.

In the above display device, it is preferable that a plurality of first electrodes are provided on one of the first substrate and the second substrate along a predetermined arrangement direction, and a plurality of second electrodes and a plurality of third electrodes are provided on the other of the first substrate and the second substrate and alternately arranged so as to intersect with the plurality of the first electrodes. Moreover, it is preferable that the plurality of the first electrodes are used as a plurality of signal electrodes, the plurality of the second electrodes are used as one of a plurality of reference electrodes and a plurality of scanning electrodes, and the plurality of the third electrodes are used as the other of the plurality of the reference electrodes and the plurality of the scanning electrodes. Further, it is preferable that the display device includes the following: a reference voltage application portion that is connected to the plurality of the reference electrodes and applies a predetermined reference voltage to each of the reference electrodes; a signal voltage application portion that is connected to the plurality of the signal electrodes and applies a signal voltage to each of the signal electrodes in accordance with information to be displayed on the display surface side; and a scanning voltage application portion that is connected to the plurality of the scanning electrodes and applies one of a non-selected voltage and a selected voltage to each of the scanning electrodes while the reference voltage application portion applies the reference voltage to each of the reference electrodes, the non-selected voltage inhibiting a movement of the conductive liquid in the display space and the selected voltage allowing the conductive liquid to move in the display space in accordance with the signal voltage.

In this case, a matrix-driven display device with excellent productivity and reliability can be easily provided.

In the above display device, a plurality of pixel regions may be provided on the display surface side, the plurality of the pixel regions may be located at each of the intersections of the signal electrodes and the scanning electrodes, and the display space in each of the pixel regions may be partitioned by a partition.

In this case, the display color on the display surface side can be changed for each pixel by moving the conductive liquid in each of the pixels on the display surface side.

In the above display device, the plurality of the pixel regions may be provided in accordance with a plurality of colors that enable full-color display to be shown on the display surface side.

In this case, the color image display can be performed by moving the corresponding conductive liquid properly in each of the pixels.

In the above display device, a plurality of the electrode members may be provided in the display space so as to sandwich each of the pixel regions.

In this case, the conductive liquid can be reliably filled into each of the pixel regions.

In the above display device, it is preferable that the plurality of the electrode members are provided in the display space in a direction parallel to a longitudinal direction of the pixel regions.

In this case, the regions to be filled with the conductive liquid can be larger, so that the conductive liquid can be more easily sealed in the display space.

In the above display device, the conductive liquid may be filled into each of the pixel regions by applying a predetermined voltage to the electrode members so that a predetermined potential difference occurs between the electrode members and at least one of the reference electrodes and the scanning electrodes.

In this case, an electrowetting phenomenon can occur between the electrode members and at least one of the reference electrodes and the scanning electrodes, so that the conductive liquid can be reliably sealed in each of the pixel regions.

In the above display device, it is preferable that a dielectric layer is formed on the surfaces of the reference electrodes and the scanning electrodes.

In this case, the dielectric layer ensures that the electric field applied to the conductive liquid is increased, so that the speed of movement of the conductive liquid can be more easily improved.

In the above display device, it is preferable that an insulating fluid that is not mixed with the conductive liquid is movably sealed in the display space.

In this case, the speed of movement of the conductive liquid can be easily improved.

A method for manufacturing a display device of the present invention is directed to the manufacture of the display device that includes a first substrate provided on a display surface side, a second substrate provided on a non-display surface side of the first substrate so that a predetermined display space is formed between the first substrate and the second substrate, and a conductive liquid movably sealed in the display space, and that is capable of changing a display color on the display surface side by moving the conductive liquid. The method includes the following: a step of forming an electrode for moving the conductive liquid in the display space on one of the first substrate and the second substrate; a step of disposing an electrode member for filling the conductive liquid, the electrode member being electrically insulated from the electrode and configured so that a predetermined voltage can be applied thereto; and a step of filling the conductive liquid onto one of the first substrate and the second substrate while applying a predetermined voltage to the electrode member so that a predetermined potential difference occurs between the electrode member and the electrode.

In the manufacturing method of the display device with the above configuration, the electrode is formed on one of the first and second substrates in the step of forming the electrode, and then the electrode member is disposed in the step of disposing the electrode member. Subsequently, the conductive liquid is filled into the display space by applying the predetermined voltage to the electrode member so that a predetermined potential difference occurs between the electrode member and the electrode in the step of filling the conductive liquid. Thus, unlike the conventional example, the conductive liquid can be easily sealed in the display space, and the productivity of the display device can be improved.

It is preferable that the above manufacturing method includes a step of forming partitions for partitioning the display space on one of the first substrate and the second substrate in accordance with a plurality of pixel regions provided on the display surface side after the step of forming the electrode, and that the electrode member is disposed parallel to a longitudinal direction of the pixel regions in the step of disposing the electrode member, and that the conductive liquid is filled in each of the pixel regions on one of the first substrate and the second substrate in the step of filling the conductive liquid.

In this case, an appropriate conductive liquid can be easily sealed in each of the pixels provided on the display surface side, so that a display device with excellent display performance can be easily provided.

Effects of the Invention

The present invention can provide a display device that has high productivity and allows the conductive liquid to be easily filled into the display space, and a method for manufacturing the display device.

BRIEF DESCRIPTION OF DRAWINGS

FIG. 1 is plan view for explaining a display device and an image display apparatus of Embodiment 1 of the present invention.

FIG. 2 is an enlarged plan view showing the main configuration of the upper substrate in FIG. 1 when viewed from a display surface side.

FIG. 3 is an enlarged plan view showing the main configuration of the lower substrate in FIG. 1 when viewed from a non-display surface side.

[FIG. 4]

FIG. 5 illustrates steps of forming the reference electrode, the scanning electrode, the dielectric layer, and the electrode member shown in FIG. 4.

[FIG. 6] FIG. 6 illustrates steps of forming the rib and the hydrophobic film shown in FIG. 4.

FIG. 7 illustrates steps of filling the conductive liquid shown in FIG. 4.

FIG. 8 illustrates steps of forming the color filter layer and the hydrophobic film shown in FIG. 4.

FIG. 9 illustrates a step of forming the signal electrode shown in FIG. 4 and the final step of manufacturing the display device.

FIG. 10 is a diagram for explaining an operation example of the image display apparatus.

FIG. 11 is an enlarged plan view showing the main configuration of the lower substrate of a display device of Embodiment 2 of the present invention when viewed from a non-display surface side.

[FIG. 12]

DESCRIPTION OF THE INVENTION

Figure 1:
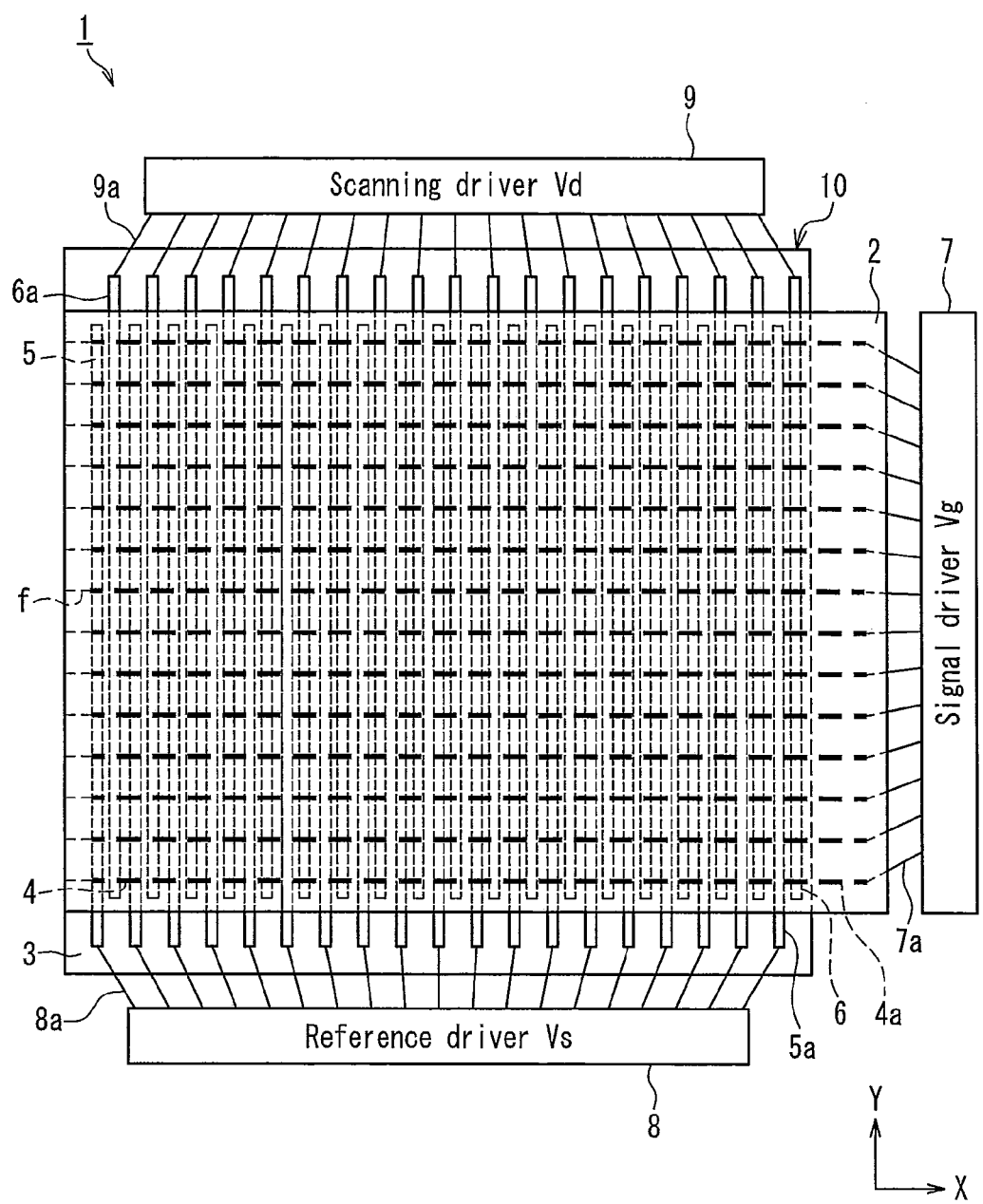
[FIG. 1]

Hereinafter, preferred embodiments of a display device and a method for manufacturing the display device of the present invention will be described with reference to the drawings. In the following description, the present invention is applied to an image display apparatus including a display portion that can display color images. The size and size ratio of each of the constituent members in the drawings do not exactly reflect those of the actual constituent members.

Embodiment 1

FIG. 1 is a plan view for explaining a display device and an image display apparatus of Embodiment 1 of the present invention. In FIG. 1, an image display apparatus 1 of this embodiment includes a display portion using a display device 10 of the present invention. The display portion has a rectangular display surface. The display device 10 includes an upper substrate 2 and a lower substrate 3 that are arranged to overlap each other in the direction perpendicular to the sheet of FIG. 1. The overlap between the upper substrate 2 and the lower substrate 3 forms an effective display region of the display surface (as will be described in detail later).

In the display device 10, a plurality of signal electrodes 4 are spaced at predetermined intervals and arranged in stripes in the X direction. Moreover, in the display device 10, a plurality of reference electrodes 5 and a plurality of scanning electrodes 6 are alternately arranged in stripes in the Y direction. The signal electrodes 4 intersect with the reference electrodes 5 and the scanning electrodes 6, and a plurality of pixel regions are located at each of the intersections of the signal electrodes 4 and the scanning electrodes 6.

The signal electrodes 4, the reference electrodes 5, and the scanning electrodes 6 are configured so that voltages in the predetermined voltage range between a High voltage (first voltage) and a Low voltage (second voltage) can be independently applied to these electrodes (as will be described in detail later).

In the display device 10, the pixel regions are separated from one another by partitions and provided in accordance with a plurality of colors that enable full-color display to be shown on the display surface, as will be described in detail later. The display device 10 changes the display color on the display surface by moving a conductive liquid (as will be described later) for each of a plurality of pixels (display cells) arranged in a matrix using an electrowetting phenomenon.

One end of the signal electrodes 4, the reference electrodes 5, and the scanning electrodes 6 are extended to the outside of the effective display region of the display surface and form terminals 4a, 5a, and 6a, respectively.

A signal driver 7 is connected to the individual terminals 4a of the signal electrodes 4 via wires 7a. The signal driver 7 constitutes a signal voltage application portion and applies a signal voltage Vg to each of the signal electrodes 4 in accordance with information when the image display apparatus 1 displays the information including characters and images on the display surface.

A reference driver 8 is connected to the individual terminals 5a of the reference electrodes 5 via wires 8a. The reference driver 8 constitutes a reference voltage application portion and applies a reference voltage Vs to each of the reference electrodes 5 when the image display apparatus 1 displays the information including characters and images on the display surface.

A scanning driver 9 is connected to the individual terminals 6a of the scanning electrodes 6 via wires 9a. The scanning driver 9 constitutes a scanning voltage application portion and applies a scanning voltage Vd to each of the scanning electrodes 6 when the image display apparatus 1 displays the information including characters and images on the display surface.

The scanning driver 9 applies either a non-selected voltage or a selected voltage to each of the scanning electrodes 6 as the scanning voltage Vd, while the reference driver 8 applies the reference voltage Vs to each of the reference electrodes 5. The non-selected voltage inhibits the movement of the conductive liquid and the selected voltage allows the conductive liquid to move in accordance with the signal voltage Vg. In the image display apparatus 1, the scanning driver 9 applies the selected voltage to each of the scanning electrodes 6 in sequence, e.g., from the left to the right of FIG. 1. Thus, the scanning driver 9 performs the scanning operation for each line (as will be described in detail later).

The signal driver 7, the reference driver 8, and the scanning driver 9 include a direct-current power supply or an alternating-current power supply that supplies the signal voltage Vg, the reference voltage Vs, and the scanning voltage Vd, respectively.

The reference driver 8 switches the polarity of the reference voltage Vs at predetermined time intervals (e.g., 1 frame). Moreover, the scanning driver 9 switches the polarity of the scanning voltage Vd in accordance with the switching of the polarity of the reference voltage Vs. Thus, since the polarities of the reference voltage Vs and the scanning voltage Vd are switched at predetermined time intervals, the localization of charges in the reference electrodes 5 and the scanning electrodes 6 can be prevented, compared to the case where the voltages with the same polarity are always applied to the reference electrodes 5 and the scanning electrodes 6. Moreover, it is possible to prevent the adverse effects of a display failure (after-image phenomenon) and low reliability (a reduction in life) due to the localization of charges.

In the display device 10, a plurality of electrode members f are spaced at predetermined intervals and arranged in stripes in the X direction so as to face each of the signal electrodes 4. The electrode members f are configured so that a predetermined voltage can be applied thereto, and are used for filling the conductive liquid. As will be described in detail later, a voltage is applied to the electrode members f only when the conductive liquid is filled during the manufacturing process of the display device 10. In other words, the electrode members f do not contribute to the display operation, namely the movement of the conductive liquid. Accordingly, the electrode members f are connected to a power source (not shown) that supplies the predetermined voltage in the filling process of the conductive liquid.

On the other hand, the signal electrodes 4, the reference electrodes 5, and the scanning electrode 6 constitute the electrodes used to move the conductive liquid in a display space (as will be described later).

The pixel structure of the display device 10 will be described in detail with reference to FIGS. 2 to 4 as well as FIG. 1.

Figure 2:
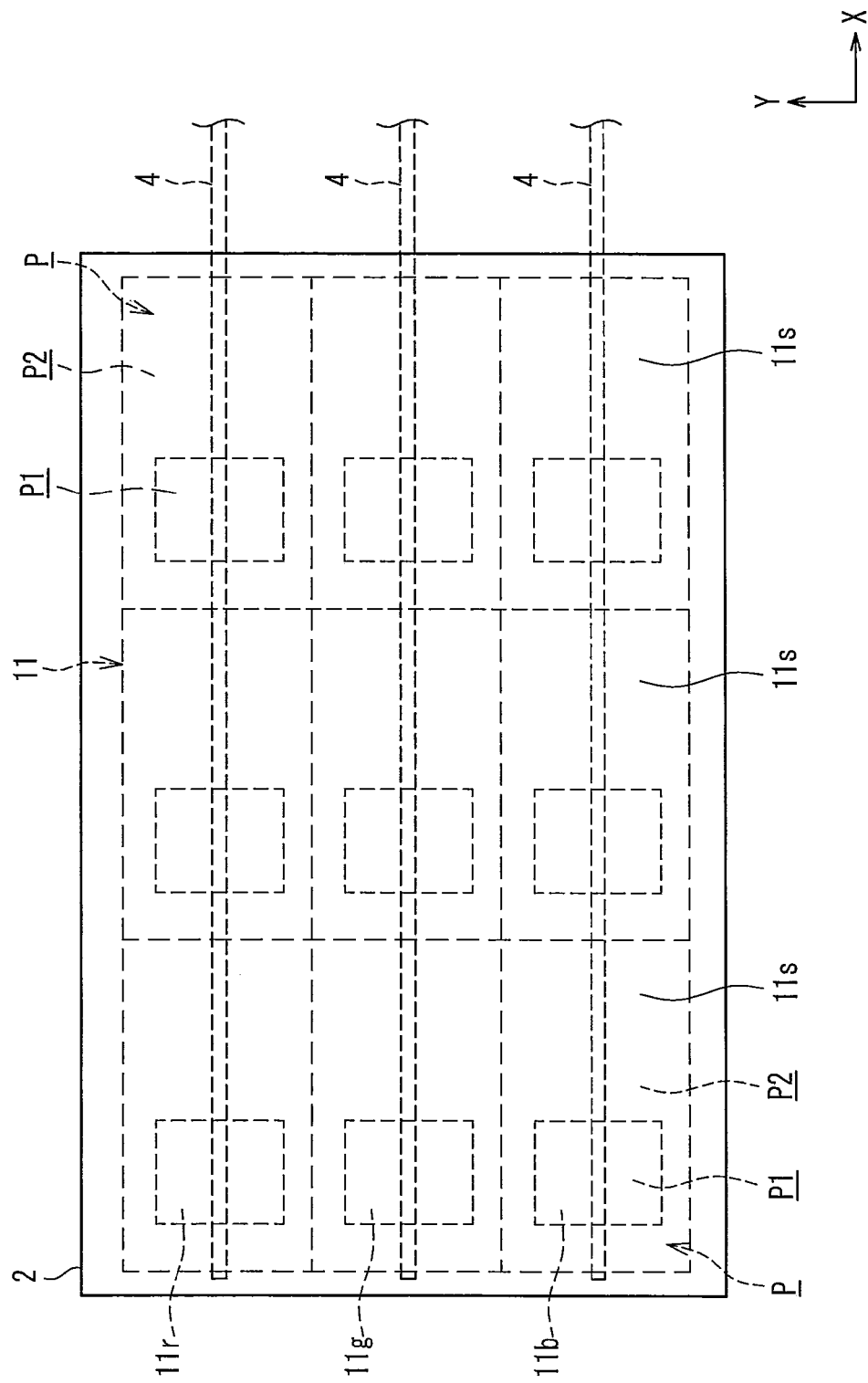
[FIG. 2]

FIG. 2 is an enlarged plan view showing the main configuration of the upper substrate in FIG. 1 when viewed from the display surface side. FIG. 3 is an enlarged plan view showing the main configuration of the lower substrate in FIG. 1 when viewed from the non-display surface side. FIGS. 4A and 4B are cross-sectional views showing the main configuration of the display device in FIG. 1 during non-CF color display and CF color display, respectively. For the sake of simplification, FIGS. 2 and 3 show nine pixels placed at the upper left corner of the plurality of pixels on the display surface in FIG. 1.

Figure 3:
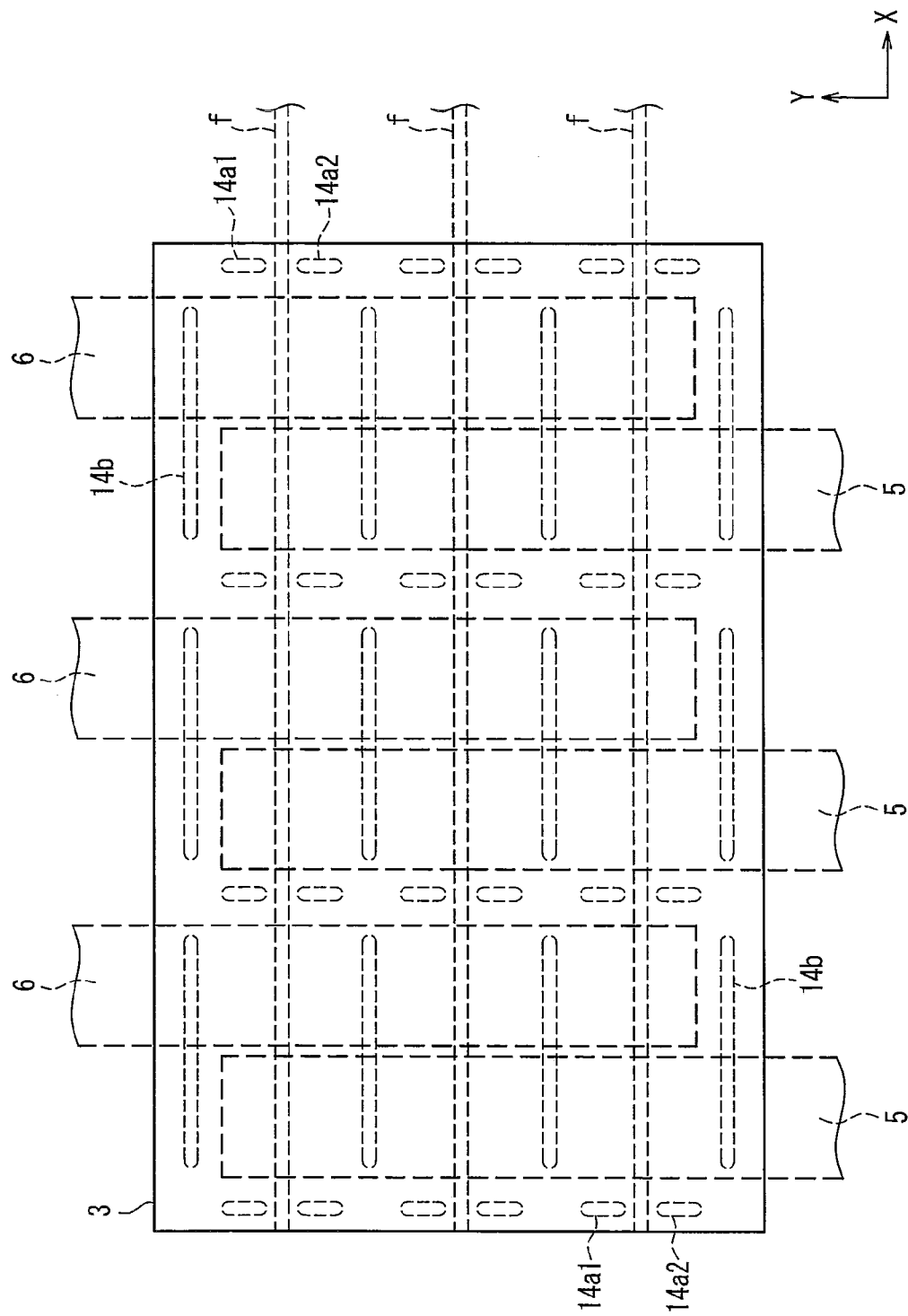
[FIG. 3]
Figure 4A:
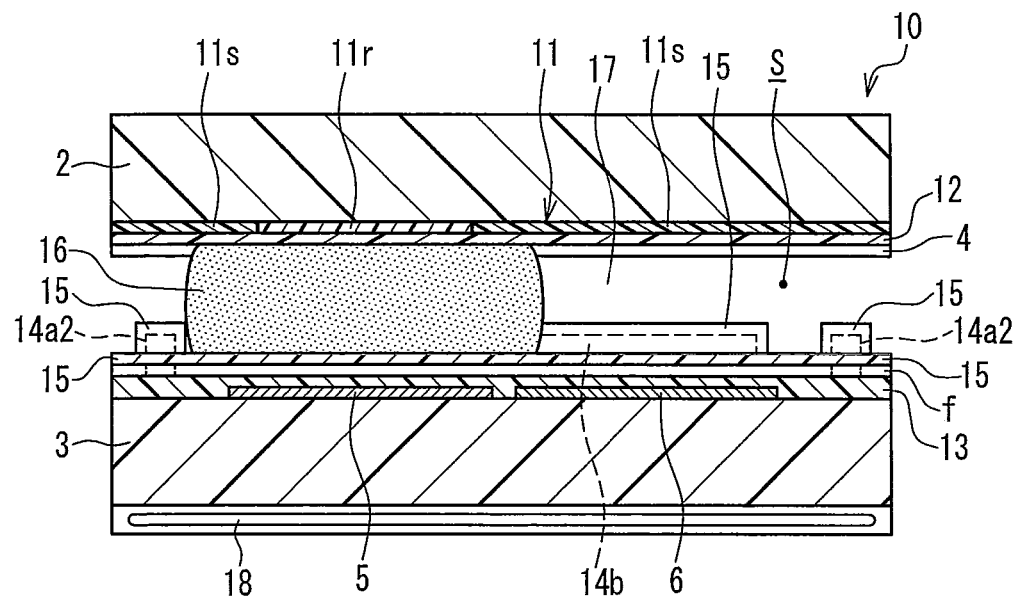
FIGS. 4A and 4B are cross-sectional views showing the main configuration of the display device in FIG. 1 during non-CF color display and CF color display, respectively.
Figure 4B:
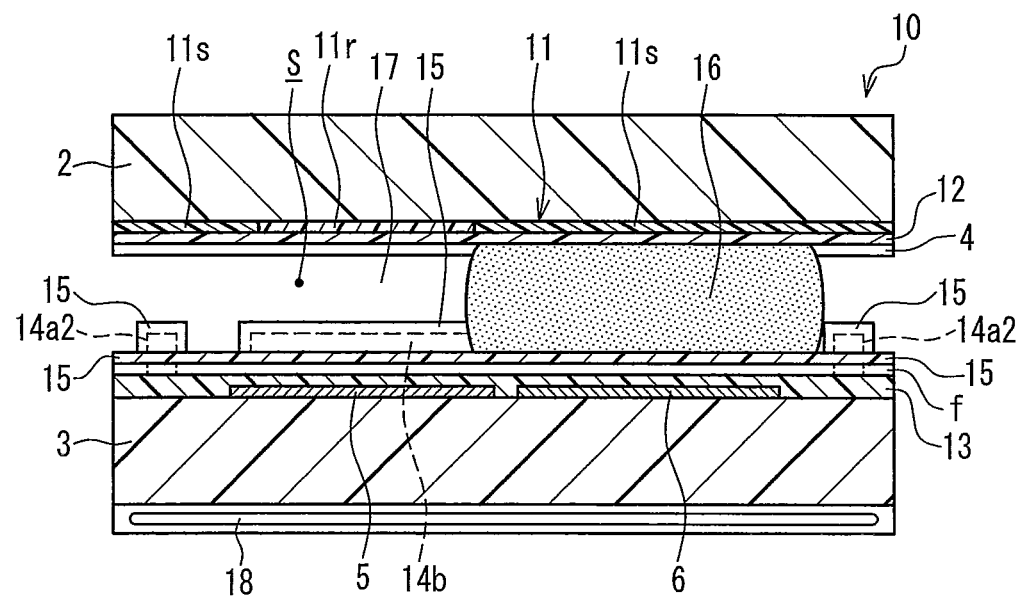

In FIGS. 2 to 4, the display device 10 includes the upper substrate 2 that is provided on the display surface side and serves as a first substrate, and the lower substrate 3 that is provided on the back (i.e., the non-display surface side) of the upper substrate 2 and serves as a second substrate. In the display device 10, the upper substrate 2 and the lower substrate 3 are located at a predetermined distance away from each other, so that a predetermined display space S is formed between the upper substrate 2 and the lower substrate 3. The conductive liquid 16 and an insulating oil 17 that is not mixed with the conductive liquid 16 are sealed in the display space S and can be moved in the X direction (the lateral direction of FIG. 4). The conductive liquid 16 can be moved toward an effective display region P1 or a non-effective display region P2, as will be described later.

The conductive liquid 16 can be, e.g., an aqueous solution including water as a solvent and a predetermined electrolyte as a solute. Specifically, 1 mmol/L of potassium chloride (KCl) aqueous solution may be used as the conductive liquid 16. Moreover, the conductive liquid 16 is colored black, e.g., with a self dispersible pigment. Specifically, the conductive liquid 16 does not use a dispersion stabilizer for pigments such as carbon black and aniline black, but includes, e.g., 0.1 wt % of the self-dispersible pigment that has been modified to improve the dispersibility of its own. The use of such a self-dispersible pigment significantly improves the dispersion stability of the pigment particles in the conductive liquid 16. Consequently, the driving properties of the conductive liquid 16 can be stable and favorable.

The conductive liquid 16 is colored black and therefore functions as a shutter that allows or prevents light transmission. When the conductive liquid 16 is slidably moved in the display space S toward the reference electrode 5 (i.e., the effective display region P1) or the scanning electrode 6 (i.e., the non-effective display region P2), the display color of each pixel of the display device 10 is changed to black or any color of RBG, as will be described in detail later.

The oil 17 can be, e.g., a nonpolar, colorless, and transparent oil including one or more than one selected from a side-chain higher alcohol, a side-chain higher fatty acid, an alkane hydrocarbon, a silicone oil, and a matching oil. The oil 17 is shifted in the display space S as the conductive liquid 16 is slidably moved.

The upper substrate 2 can be, e.g., a transparent glass material such as a non-alkali glass substrate or a transparent sheet material such as a transparent resin (e.g., an acrylic resin). A color filter layer 11 and a hydrophobic film 12 are formed in this order on the surface of the upper substrate 2 that faces the non-display surface side. Moreover, the signal electrodes 4 (first electrodes) are provided on the hydrophobic film 12.

Like the upper substrate 2, the lower substrate 3 can be, e.g., a transparent glass material such as a non-alkali glass substrate or a transparent sheet material such as a transparent resin (e.g., an acrylic resin). The reference electrodes 5 (second electrodes) and the scanning electrodes 6 (third electrodes) are provided on the surface of the lower substrate 3 that faces the display surface side. Moreover, a dielectric layer 13 is formed to cover the reference electrodes 5 and the scanning electrodes 6. Ribs 14a1, 14a2, and 14b are formed parallel to the Y direction and the X direction, respectively, on the surface of the dielectric layer 13 that faces the display surface side.

Moreover, the electrode members f are provided on dielectric layer 13 of the lower substrate 3 so that each of the electrode members f is disposed between the ribs 14a1 and 14b2 that are arranged in the Y direction. As described above, the electrode members f are positioned opposite the signal electrodes 4, and provided in the display space S in the direction parallel to the longitudinal direction (X direction) of the pixel regions P (FIG. 2).

In the lower substrate 3, a hydrophobic film 15 is formed to cover the dielectric layer 13, the ribs 14a1, 14a2, and 14b, and the electrode members f. This hydrophobic film 15 does not electrically insulate the electrode members f from the conductive liquid 16, but allows the electrode members f to come into contact with the conductive liquid 16.

A backlight 18 that emits, e.g., white illumination light is integrally attached to the back (i.e., the non-display surface side) of the lower substrate 3, thus providing a transmission type display device 10. Since the display device 10 of this embodiment uses the backlight 18, a proper display operation can be performed even with insufficient ambient light or at nighttime. Moreover, this embodiment can easily provide a high brightness display device 10 that has a large dimming range and is readily capable of performing a high precision gradation control.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 2, the R, G, and B color filters 11r, 11g, and 11b are successively arranged in rows in the Y direction, and each row includes three color filters in the X direction. Thus, a total of nine pixels are arranged in three columns (the X direction) and three rows (the Y direction).

As shown in FIG. 2, in each of the pixel regions P of the display device 10, any of the R, G, and B color filters 11r, 11g, and 11b is provided in a portion corresponding to the effective display region P1 and the black matrix 11s is provided in a portion corresponding to the non-effective display region P2 of the pixel. In other words, with respect to the display space S, the non-effective display region (non-aperture region) P2 is defined by the black matrix (light-shielding layer) 11s and the effective display region P1 is defined by an aperture (i.e., any of the color filters 11r, 11g, and 11b) formed in that black matrix 11s.

In the display device 10, the area of each of the color filters 11r, 11g, and 11b is the same as or slightly larger than that of the effective display region P1. On the other hand, the area of the black matrix 11s is the same as or slightly smaller than that of the non-effective display region P2. In FIG. 2, the boundary between two black matrixes 11s corresponding to the adjacent pixels is indicated by a dotted line to clarify the boundary between the adjacent pixels. Actually, however, no boundary is present between the black matrixes 11s of the color filter layer 11.

In the display device 10, the display space S is divided into the pixel regions P by the ribs 14a1, 14a2, and 14b serving as the partitions as described above. Specifically, as shown in FIG. 3, the display space S of each pixel is partitioned by two opposing ribs 14a1, 14a2 and two opposing ribs 14b. Thus, the dimension of the pixel region P (FIG. 2) in the X direction is defined by the two opposing ribs 14a1, 14a2, and the dimension of the pixel region P in the Y direction is defined by the two opposing ribs 14b.

Moreover, in the display device 10, the ribs 14a1, 14a2, and 14b prevent the conductive liquid 16 from flowing into the display space S of the adjacent pixel regions P. The ribs 14a1, 14a2, and 14b are made of, e.g., a light-curing resin, and the height of the ribs 14a1, 14a2, and 14b protruding from the dielectric layer 13 is determined so as to prevent the flow of the conductive liquid 16 between the adjacent pixels.

Other than the above description, e.g., frame-shaped ribs may be formed for each pixel on the lower substrate 3 instead of the ribs 14a1, 14a2, and 14b. Moreover, the top of the frame-shaped ribs may be brought into dose contact with the upper substrate 2 so that the adjacent pixel regions P are hermetically separated from one another. When the top of the ribs comes into close contact with the upper substrate 2, the signal electrodes 4 are provided to penetrate the ribs, and thus can be placed in the display space S.

The hydrophobic films 12, 15 are made of, e.g., a transparent resin, and preferably a fluoropolymer (e.g., with a thickness of 60 nm) that functions as a hydrophilic layer for the conductive liquid 16 when a voltage is applied. This can significantly change the wettability (contact angle) between the conductive liquid 16 and each of the surfaces of the upper and lower substrates 2, 3 that face the display space S. Thus, the speed of movement of the conductive liquid 16 can be improved. The dielectric layer 13 can be, e.g., a transparent high dielectric film such as a silicon nitride (SiNx) film (e.g., with a thickness of 350 nm).

The reference electrodes 5 and the scanning electrodes 6 are made of, e.g., transparent electrode materials such as indium oxides (ITO), tin oxides ($SnO_2$), and zinc oxides (AZO, GZO, or IZO). The reference electrodes 5 and the scanning electrodes 6 are formed in stripes on the lower substrate 3 by a known film forming method such as sputtering so that the thickness of each of the electrodes is, e.g., 100 nm.

The signal electrodes 4 can be, e.g., linear wiring that is arranged parallel to the X direction. The signal electrodes 4 are placed on the hydrophobic film 12 so as to extend substantially through the center of each of the pixel regions P in the Y direction, and further to come into direct contact with the conductive liquid 16 by passing through the conductive liquid 16. This can improve the responsibility of the conductive liquid 16 during a display operation.

A transparent hydrophobic film (not shown) made of, e.g., a fluoropolymer is formed on the surfaces of the signal electrodes 4 and allows the conductive liquid 16 to move smoothly. This hydrophobic film does not electrically insulate the signal electrodes 4 from the conductive liquid 16, and therefore not interfere with the improvement in responsibility of the conductive liquid 16.

Other than the above description, the color filter layer 11, the signal electrodes 4, and the hydrophobic film 12 may be formed in this order on the surface of the upper substrate 2 that faces the non-display surface side.

A material that is electrochemically inert to the conductive liquid 16 is used for the signal electrodes 4. Therefore, even if the signal voltage Vg (e.g., 40 V) is applied to the signal electrodes 4, the electrochemical reaction between the signal electrodes 4 and the conductive liquid 16 can be minimized. Thus, it is possible to prevent electrolysis of the signal electrodes 4 and to improve the reliability and life of the display device 10.

Specifically, the signal electrodes 4 are made of, e.g., an electrode material including at least one of gold, silver, copper, platinum, and palladium. The signal electrodes 4 may be formed by fixing thin wires made of the above metal material on the color filter layer 11 or by mounting an ink material such as a conductive paste containing the metal material on the color filter layer 11 with screen printing or the like.

The shape of the signal electrode 4 is determined using the transmittance of the reference electrode 5 located below the effective display region P1 of the pixel. Specifically, based on a transmittance of about 75% to 95% of the reference electrode 5, the shape of the signal electrode 4 is determined so that the occupation area of the signal electrode 4 on the effective display region P1 is 30% or less, preferably 10% or less, and more preferably 5% or less of the area of the effective display region P1.

The electrode members f can be, e.g., linear wiring that is arranged parallel to the X direction. The electrode members f are placed under the signal electrodes 4 so as to extend substantially through the center of each of the pixel regions P in the Y direction.

Since the electrode members f come into contact with the conductive liquid 16, similarly to the signal electrodes 4, a material that is electrochemically inert to the conductive liquid 16 is used for the electrode members f. Specifically, the electrode members f are provided in the display space S by forming an electrode material including at least one of gold, silver, copper, platinum, and palladium on the dielectric layer 13, e.g., with screen printing. Thus, it is possible to prevent electrolysis of the electrode members f and to improve the reliability and life of the display device 10. The shape of the electrode member f is selected to be the same as that of the signal electrode 4.

Hereinafter, a manufacturing process of the display device 10 will be described in detail with reference to FIGS. 5 to 9.

FIG. 5 illustrates steps of forming the reference electrode, the scanning electrode, the dielectric layer, and the electrode member shown in FIG. 4. FIG. 6 illustrates steps of forming the rib and the hydrophobic film shown in FIG. 4. FIG. 7 illustrates steps of filling the conductive liquid shown in FIG. 4. FIG. 8 illustrates steps of forming the color filter layer and the hydrophobic film shown in FIG. 4. FIG. 9 illustrates a step of forming the signal electrode shown in FIG. 4 and the final step of manufacturing the display device.

Figure 5A:
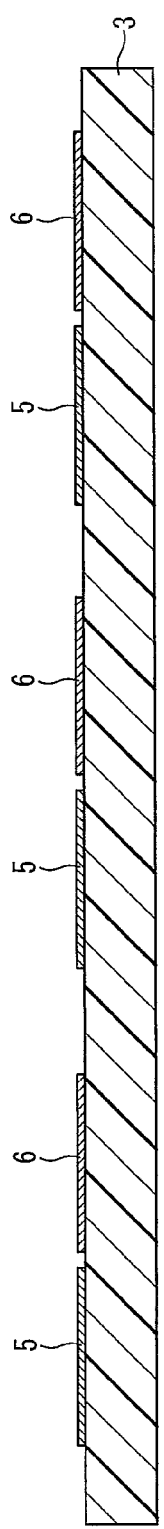
[FIG. 5]

In FIG. 5A, the lower substrate 3 is, e.g., a non-alkali glass substrate with a thickness of 0.7 mm, and a step of forming the electrodes on the lower substrate 3 is performed. Specifically, an ITO film with a thickness of 100 nm is formed on the surface of the lower substrate 3 by sputtering, so that the reference electrodes 5 and the scanning electrodes 6 are formed. The reference electrodes 5 and the scanning electrodes 6 are alternately arranged in the longitudinal direction of the pixel regions P.

Figure 5B:
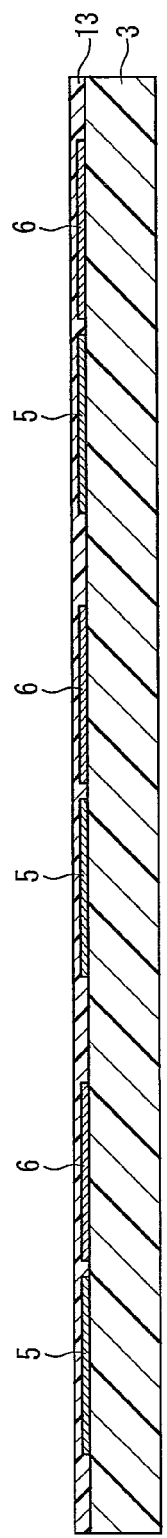

Subsequently, as shown in FIG. 5B, a step of forming the dielectric layer 13 is performed. Specifically, a silicon nitride film is formed as the dielectric layer 13 over the lower substrate 3, the reference electrodes 5, and the scanning electrodes 6, e.g., by a CVD method. The thickness of the dielectric layer 13 is, e.g., 350 nm.

Figure 5C:
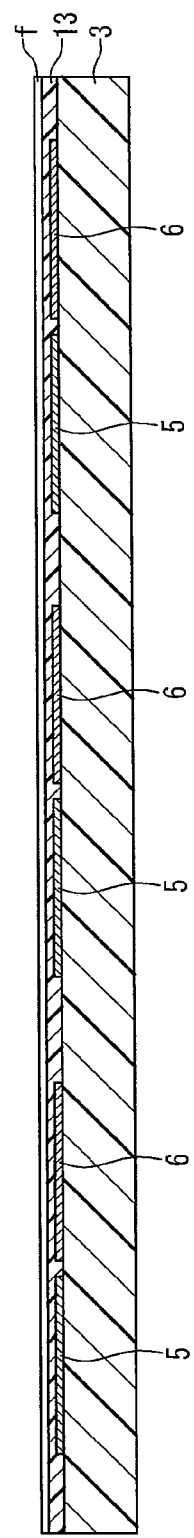

Then, as shown in FIG. 5C, the electrode members f are formed by mounting an ink material such as a conductive paste containing gold on the surface of the dielectric layer 13, e.g., with screen printing. The electrode members f are arranged along the longitudinal direction (X direction) of the pixel regions P so as to be perpendicular to both the reference electrodes 5 and the scanning electrodes 5 and also to extend through the center of each of the pixel regions P in the Y direction. The specific width (i.e., the dimension in the Y direction) of the electrode member f is, e.g., 10 μm.

Next, as shown in FIG. 6A, a step of forming the ribs 14a1, 14a2, and 14b is performed. Specifically, the ribs 14a1, 14a2, and 14b made of a UV curable resin are formed for each of the pixel regions P on the surface of the dielectric layer 13, e.g., by photolithography. Consequently, the ribs (partitions) 14a1, 14a2, and 14b for partitioning the display space S in accordance with the individual pixel regions P provided on the display surface side are disposed on the lower substrate (one of the substrates) 3, so that the step of forming the ribs 14a1, 14a2, and 14b is completed.

The specific dimensions of the pixel region P in the X direction and the Y direction are 2.7 mm and 1.8 mm, respectively (corresponding to the dimensions of the display space S in the X direction and the Y direction). The height of the ribs 14a1, 14a2, and 14b protruding from the dielectric layer 13 is, e.g., 350 μm, and their widths in the X direction and the Y direction are each, e.g., 50 μm.

Thereafter, as shown in FIG. 6B, a step of forming the hydrophobic film 15 is performed. Specifically, e.g., a fluoropolymer material is applied to the surfaces of the dielectric layer 13, the electrode members f, and the ribs 14a1, 14a2, and 14b by dipping, and then fired at 80° C. for 30 minutes, so that the hydrophobic film 15 is formed. The thickness of the hydrophobic film 15 is, e.g., 60 nm. Thus, an intermediate substrate Sb1 including the lower substrate 3 is completed, in which the conductive liquid 16 has not been held yet. Since the hydrophobic film 15 is formed over the lower substrate 3, including the electrode members f, the portions that are to come into contact with the conductive liquid 16 are made water repellent. This allows the conductive liquid 16 to move smoothly.

Figure 7A:
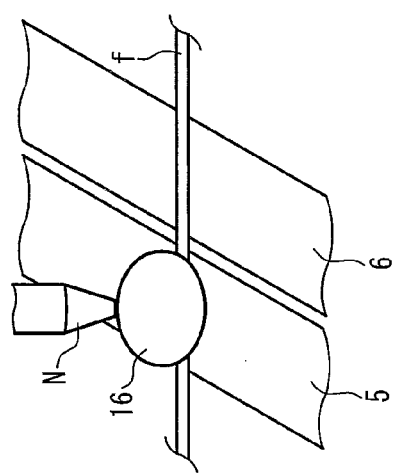
[FIG. 7]
Figure 7B:
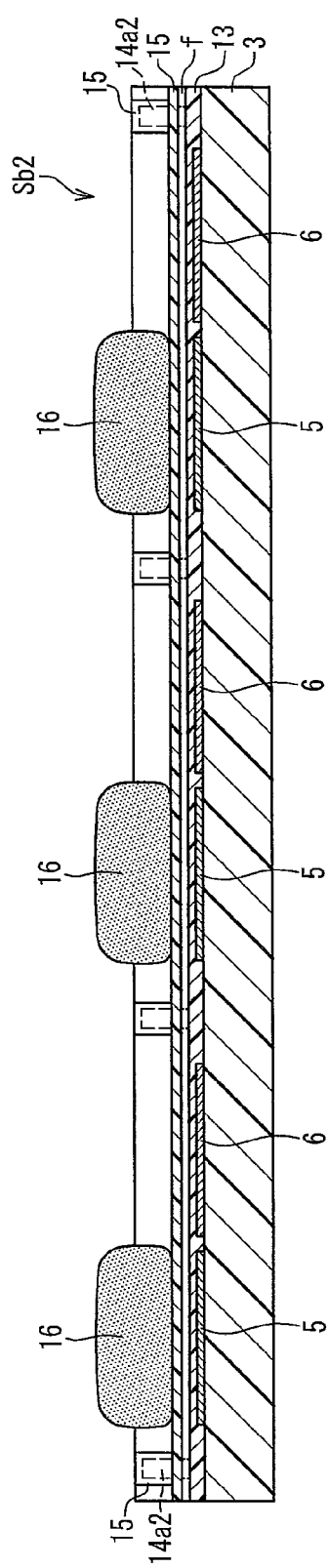

Next, as shown in FIG. 7A, a step of filling the conductive liquid 16 into the intermediate substrate Sb1 is performed. Specifically, in the step of filling, e.g., a DC voltage of 8 V is applied to the reference electrodes 5, and 0 V is applied to the scanning electrodes 6 and the electrode members f, i.e., they are grounded (GND). In other words, the step of filling is performed while an electrowetting phenomenon occurs between the reference electrodes 5 and the electrode members f.

In the step of filling, first, the pixel regions P of the intermediate substrate Sb1, which are separated from one another by the ribs 14a1, 14a2, and 14b, are filled with the oil 17 (not shown) that is, e.g., n-dodecane. Then, the conductive liquid 16 is introduced into each of the pixel regions P using a nozzle N of a dispenser, as shown in FIG. 7A. In this case, the conductive liquid 16 can be, e.g., a potassium chloride (KCl) aqueous solution containing the self-dispersible pigment. Thus, a complete substrate Sb2 including the lower substrate 3 is finally provided, in which the conductive liquid 16 and the oil 17 (not shown) are held.

As described above, since the step of filling is performed while an electrowetting phenomenon occurs, the conductive liquid 16 can be reliably filled onto the lower substrate 3 provided with the reference electrodes 5 and the electrode members f, and sealed in each of the pixel regions P. Moreover, the electrode members f are arranged parallel to the longitudinal direction of the pixel regions P. Therefore, the regions to be filled with the conductive liquid 16 can be larger, so that the conductive liquid 16 can be more easily sealed in the display space S.

The specific amount of the conductive liquid 16 filled into each of the pixel regions P is, e.g., 0.32 μL. The inner diameter of the nozzle N of the dispenser is, e.g. 100 μm.

Other than the above description, the step of filling the conductive liquid 16 may be performed in the following manner. For example, a DC voltage of 10 V is applied to both the reference electrodes 5 and the scanning electrodes 6, and the electrode members f are grounded, or a DC voltage of 10 V is applied to the electrode members f, and both the reference electrodes 5 and the scanning electrodes 6 are grounded. By applying the voltage in this manner, the entire surface of the lower substrate 3 can be made hydrophilic, and the conductive liquid 16 can be more easily and reliably filled. Even if the positioning accuracy of the nozzle N relative to the pixel region P is low, that is, even if a positional deviation of the nozzle N is tolerated to some extent, the above voltage application can ensure that the conductive liquid 16 is sealed in each of the pixel regions P, compared to the case where either the reference electrodes 5 or the scanning electrodes 6 are subjected to a voltage application or grounding.

Figure 8A:
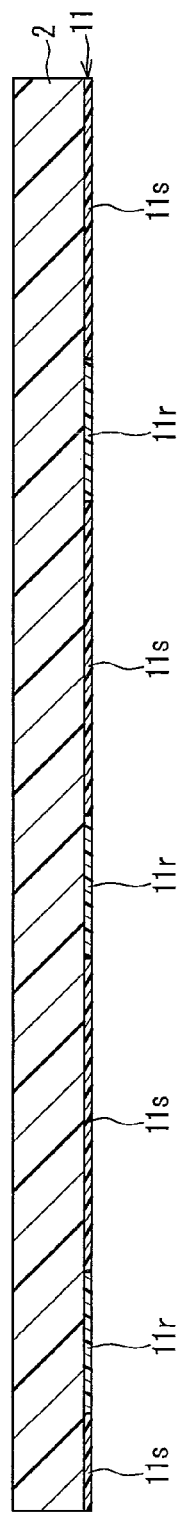
[FIG. 8]

In FIG. 8A, the upper substrate 2 is, e.g., a non-alkali glass substrate with a thickness of 0.7 mm, and a step of forming the color filters is performed. Specifically, the color filters 11r, 11g, and 11b and the black matrixes 11s are formed on the surface of the upper substrate 2, e.g., by photolithography, so that the color filter layer 11 is formed. The color filter layer 11 includes a pigment corresponding to a photosensitive resin (e.g., a photoreactive acrylic monomer) and has a thickness of, e.g., about 2 μm.

Figure 8B:
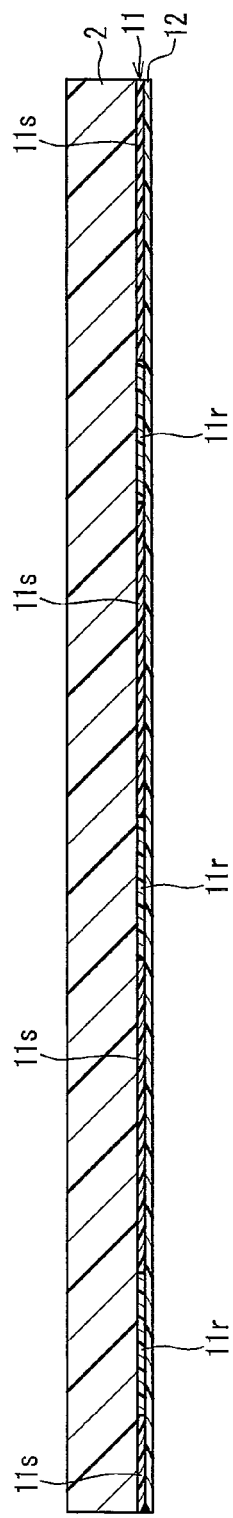

Then, as shown in FIG. 8B, a step of forming the hydrophobic film 12 is performed. Specifically, e.g., a fluoropolymer material is applied to the surface of the color filter layer 11 by dipping, and then fired at 80° C. for 30 minutes, so that the hydrophobic film 12 is formed. The thickness of the hydrophobic film 12 is, e.g., 60 nm.

Figure 9A:
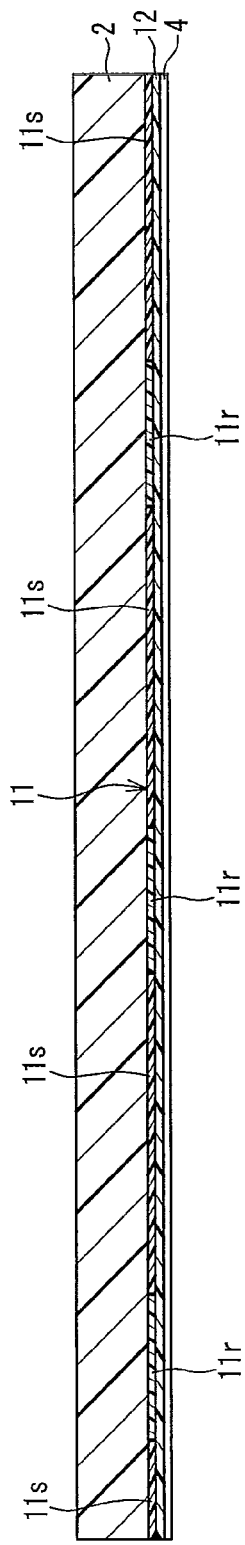
[FIG. 9]

Next, as shown in FIG. 9A, a step of forming the electrodes on the upper substrate 2 is performed. Specifically, e.g., thin wires made of gold are fixed on the surface of the color filter layer 11, so that the signal electrodes 4 are formed.

Figure 9B:
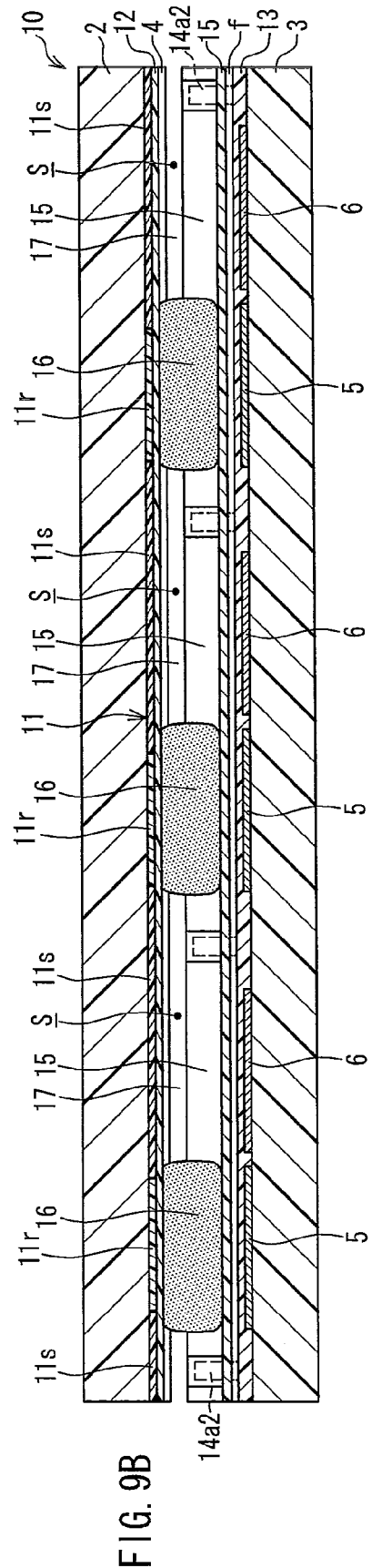

Then, as shown in FIG. 9B, the upper substrate 2 that is placed above and the lower substrate 3 that holds the conductive liquid 16 and the oil 17 are integrated using, e.g., an UV adhesive, and thereby the display device 10 is completed. A distance (gap) between the upper substrate 2 and the lower substrate 3 is, e.g., 400 μm.

Moreover, since the electrowetting phenomenon continues from the previous step of filling, the step of integrating the upper substrate 2 with the lower substrate 3 can be performed while preventing the movement of the conductive liquid 16 to the adjacent pixel regions P.

Hereinafter, a display operation of the image display apparatus 1 of this embodiment having the above configuration will be described in detail with reference to FIG. 10.

Figure 10:
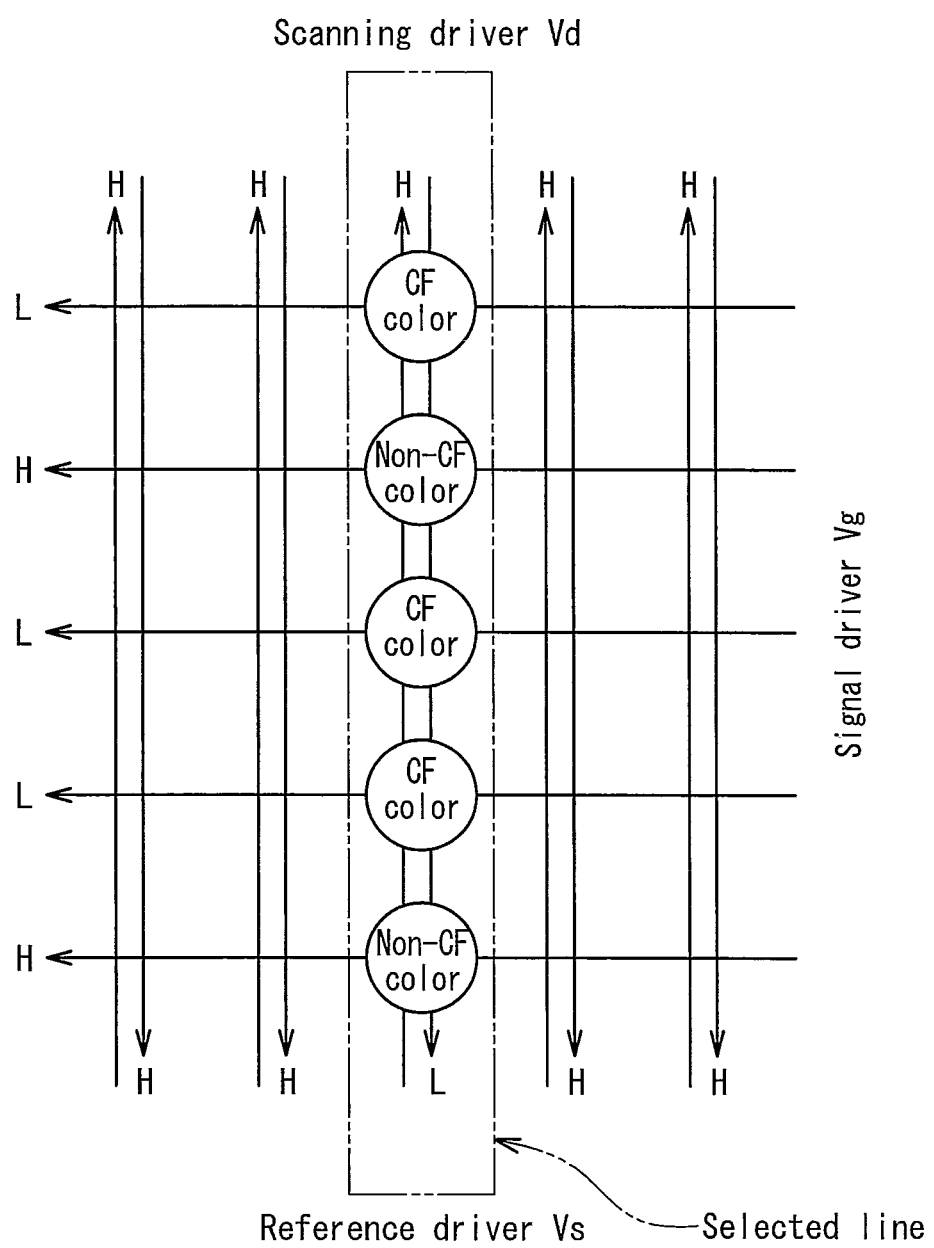
[FIG. 10]

FIG. 10 is a diagram for explaining an operation example of the image display apparatus 1.

In FIG. 10, the reference driver 8 always applies a High voltage (first voltage) as the reference voltage Vs to all the reference electrodes 5. The scanning driver 9 applies the selected voltages as the scanning voltage Vd to the scanning electrodes 6 in sequence in a predetermined scanning direction, e.g., from the left to the right of FIG. 10. Specifically, the scanning driver 9 performs the scanning operation to determine a selected line by applying a Low voltage (second voltage) as the selected voltage to the scanning electrodes 6 in sequence. In this selected line, the signal driver 7 applies a High or Low voltage as the signal voltage Vg to the corresponding signal electrodes 4 in accordance with the external image input signal. Thus, in each of the pixels of the selected line, the conductive liquid 16 is moved toward the effective display region P1 or the non-effective display region P2, and the display color on the display surface is changed accordingly.

Moreover, the scanning driver 9 determines non-selected lines by applying a High voltage as the non-selected voltage to all the remaining scanning electrodes 6 to which the Low voltage has not been applied. Thus, in each of the pixels of the non-selected lines, the conductive liquid 16 stands still in the effective display region P1 or the non-effective display region P2, and the display color on the display surface is unchanged.

Table 1 shows the combinations of the voltages applied to the reference electrodes 5, the scanning electrodes 6, and the signal electrodes 4 in the above display operation. As shown in Table 1, the behavior of the conductive liquid 16 and the display color on the display surface depend on the applied voltages. In Table 1, the High voltage and the Low voltage are abbreviated to "H" and "L", respectively (the same is true for Table 2 in the following).

TABLE 1

| | Reference electrode | Scanning electrode | Signal electrode | Behavior of conductive liquid and display color on display surface |
|---|---|---|---|---|
| Selected line | H | L | H | The conductive liquid is moved toward the scanning electrode. CF color display |
| | | | L | The conductive liquid is moved toward the reference electrode. Black display |
| Non-selected line | H | H | H | The conductive liquid is still (not moving). Black or CF color display |
| | | | L | |

<Selected Line Operation>

In the selected line, e.g., when the High voltage is applied to the signal electrodes 4, there is no potential difference between the reference electrode 5 and the signal electrodes 4 because the High voltage is applied to both of these electrodes. On the other hand, a potential difference between the signal electrodes 4 and the scanning electrode 6 occurs because the Low voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved toward the non-effective display region P2, as shown in FIG. 4B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the conductive liquid 16 toward the non-effective display region P2, the red, green, and blue colors of light from the corresponding R, G, and B pixels are mixed into white light, resulting in the white display.

In the selected line, when the Low voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode 5 that makes a potential difference from the signal electrodes 4. Consequently, the conductive liquid 16 has been moved toward the effective display region P1, as shown in FIG. 4A, and prevents the illumination light emitted from the backlight 18 from reaching the color filter 11r. Thus, the display color on the display surface becomes black display (i.e., the non-CF color display) due to the presence of the conductive liquid 16.

<Non-selected Line Operation>

In the non-selected lines, e.g., when the High voltage is applied to the signal electrodes 4, there is no potential difference among the signal electrodes 4, the reference electrodes 5, and the scanning electrodes 6 because the High voltage is applied to all of these electrodes. Therefore, the conductive liquid 16 stays in the same position, i.e., it is not moving from the reference electrode 5 side or the scanning electrode 6 side, but stands still. Consequently, the display color is maintained without changing from the black display or the CF color display in the current state.

Similarly, in the non-selected lines, even when the Low voltage is applied to the signal electrodes 4, the conductive liquid 16 stands still in the same position, and the current display color is maintained. Since the High voltage is applied to both the reference electrodes 5 and the scanning electrodes 6, the potential difference between the reference electrodes 5 and the signal electrodes 4 is the same as that between the scanning electrodes 6 and the signal electrodes 4.

As described above, in the non-selected lines, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1, depending on the combinations of the applied voltages in Table 1, the display color of each pixel on the selected line can be, e.g., the CF colors (red, green, or blue) produced by the color filters 11r, 11g, and 11b or the non-CF color (black) due to the conductive liquid 16 in accordance with the voltage applied to the signal electrodes 4 corresponding to the individual pixels, as shown in FIG. 10. When the scanning driver 9 determines a selected line of the scanning electrode 6 by performing the scanning operation, e.g., from the left to the right of FIG. 10, the display colors of the pixels in the display portion of the image display apparatus 1 also are changed in sequence from the left to the right of FIG. 10. Therefore, if the scanning driver 9 performs the scanning operations at a high speed, the display colors of the pixels in the display portion of the image display apparatus 1 also can be changed at a high speed. Moreover, by applying the signal voltage Vg to the signal electrodes 4 in synchronization with the scanning operation for the selected line, the image display apparatus 1 can display various information including dynamic images based on the external image input signal.

The combinations of the voltages applied to the reference electrodes 5, the scanning electrodes 6, and the signal electrodes 4 are not limited to Table 1, and may be as shown in Table 2.

TABLE 2

| | Reference electrode | Scanning electrode | Signal electrode | Behavior of conductive liquid and display color on display surface |
|---|---|---|---|---|
| Selected line | L | H | L | The conductive liquid is moved toward the scanning electrode. CF color display |
| | | | H | The conductive liquid is moved toward the |

TABLE 2-continued

|  | Reference electrode | Scanning electrode | Signal electrode | Behavior of conductive liquid and display color on display surface |
|---|---|---|---|---|
|  |  |  |  | reference electrode. Black display |
| Non-selected line |  | L | H | The conductive liquid is still (not moving). |
|  |  |  | L | Black or CF color display |

The reference driver 8 always applies a Low voltage (second voltage) as the reference voltage Vs to the reference electrodes 5. The scanning driver 9 performs the scanning operation to determine a selected line by applying a High voltage (first voltage) as the selected voltage to the scanning electrodes 6 one by one from the left to the right of FIG. 1. Moreover, the scanning driver 9 determines non-selected lines by applying a Low voltage as the non-selected voltage to all the remaining scanning electrodes 6 to which the High voltage has not been applied. The signal driver 7 applies a High or Low voltage as the signal voltage Vg to the signal electrodes 4 in accordance with the external image input signal.

<Selected Line Operation>

In the selected line, e.g., when the Low voltage is applied to the signal electrodes 4, there is no potential difference between the reference electrode 5 and the signal electrodes 4 because the Low voltage is applied to both of these electrodes. On the other hand, a potential difference between the signal electrodes 4 and the scanning electrode 6 occurs because the High voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved toward the non-effective display region P2, as shown in FIG. 4B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. Like Table 1, when the CF color display is performed in all the three adjacent R, G, and B pixels, the white display is performed.

In the selected line, when the High voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode 5 that makes a potential difference from the signal electrodes 4. Consequently, the conductive liquid 16 has been moved toward the effective display region P1, as shown in FIG. 4A, and prevents the illumination light emitted from the backlight 18 from reaching the color filter 11r. Thus, the display color on the display surface becomes black display (i.e., the non-CF color display) due to the presence of the conductive liquid 16.

<Non-selected Line Operation>

In the non-selected lines, e.g., when the Low voltage is applied to the signal electrodes 4, there is no potential difference among the signal electrodes 4, the reference electrodes 5, and the scanning electrodes 6 because the Low voltage is applied to all of these electrodes. Therefore, the conductive liquid 16 stays in the same position, i.e., it is not moving from the reference electrode 5 side or the scanning electrode 6 side, but stands still. Consequently, the display color is maintained without changing from the black display or the CF color display in the current state.

Similarly, in the non-selected lines, even when the High voltage is applied to the signal electrodes 4, the conductive liquid 16 stands still in the same position, and the current display color is maintained. Since the Low voltage is applied to both the reference electrodes 5 and the scanning electrodes 6, the potential difference between the reference electrodes 5 and the signal electrodes 4 is the same as that between the scanning electrodes 6 and the signal electrodes 4.

In the non-selected lines, as shown in Table 2, similarly to Table 1, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 not only has two values of the High voltage and the Low voltage, but also may be changed between the High voltage and the Low voltage in accordance with information to be displayed on the display surface. That is, the image display apparatus 1 can perform the gradation display by controlling the signal voltage Vg. Thus, the display device 10 can achieve excellent display performance.

In the display device 10 of this embodiment having the above configuration, the electrode members f are provided in the display space S, and the conductive liquid 16 is filled into the display space S by applying 0 V (a predetermined voltage) to the electrode members f. With this configuration, unlike the conventional example, the conductive liquid 16 can be easily sealed in the display space S, and the productivity (production efficiency) of the display device 10 can be improved.

In this embodiment, the step of filling the conductive liquid 16 is performed while an electrowetting phenomenon occurs between the reference electrodes 5 and the electrode members f. Therefore, the conductive liquid 16 can be held on the lower substrate (one of the substrates) 3 and reliably filled into the display space S.

In the display device 10 of this embodiment, the plurality of reference electrodes (second electrodes) 5 and the plurality of scanning electrodes (third electrodes) 6 are alternately arranged on the lower substrate (second substrate) 3 so as to intersect with the plurality of signal electrodes 4. Moreover, in the display device 10 of this embodiment, the signal driver (signal voltage application portion) 7, the scanning driver (scanning voltage application portion) 9, and the reference driver (reference voltage application portion) 8, and apply the signal voltage, the scanning voltage (the selected voltage or the non-selected voltage), and the reference voltage to the signal electrodes 4, the scanning electrodes 6, and the reference electrodes 5, respectively. Thus, this embodiment can provide the matrix-driven display device 10 with excellent productivity and reliability.

Embodiment 2

Figure 11:
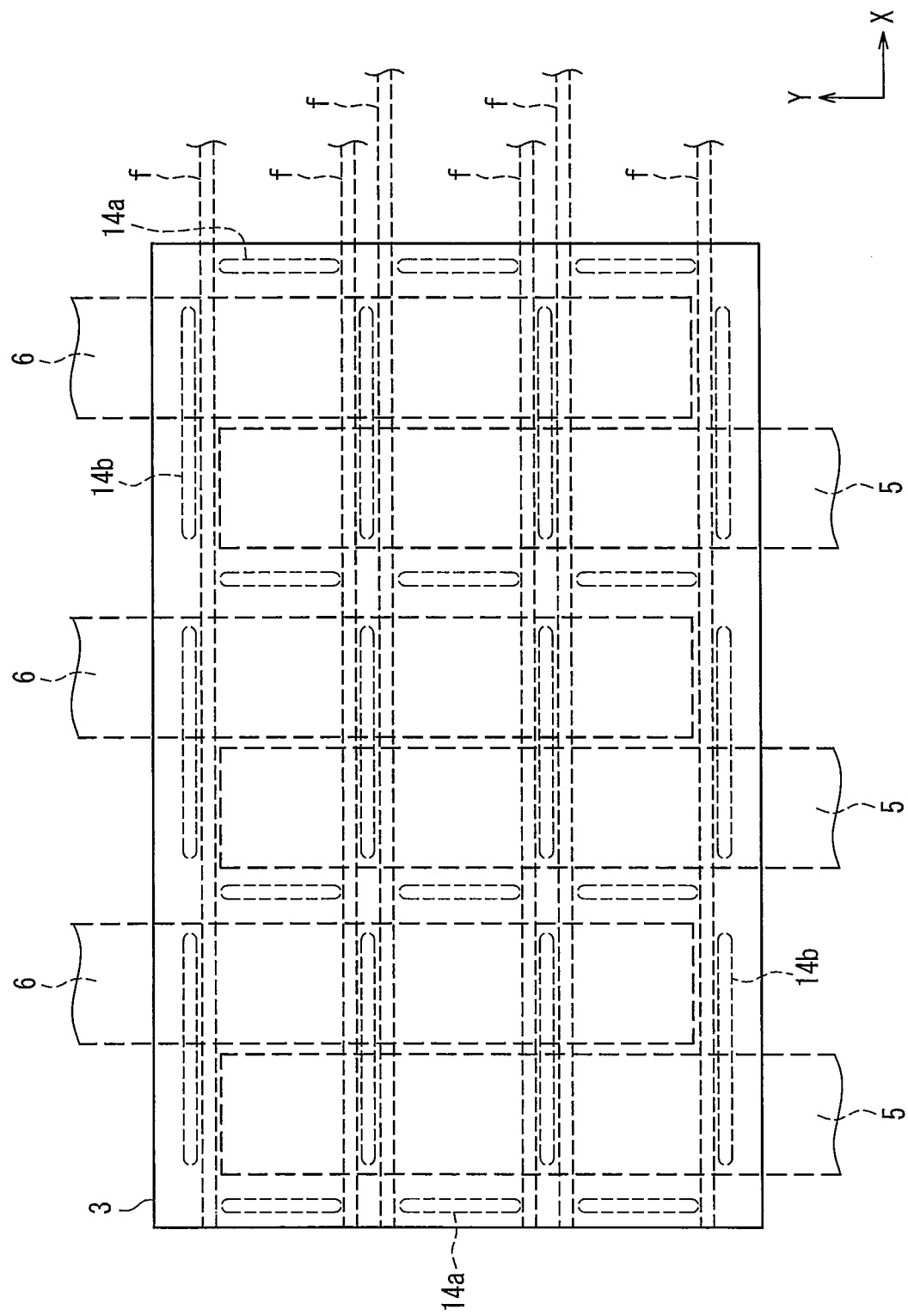
[FIG. 11]
Figure 12A:
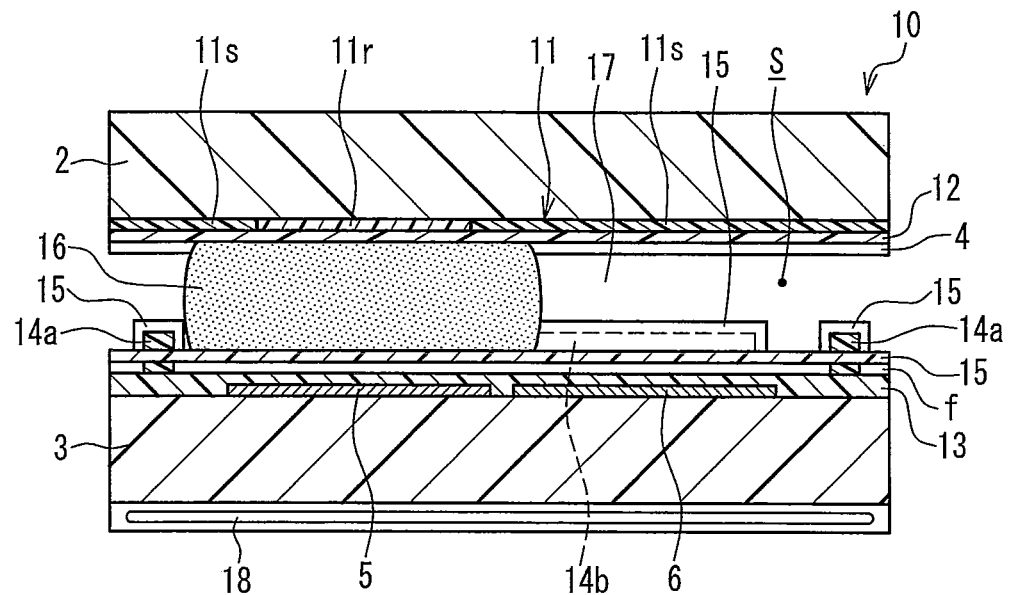
FIGS. 12A and 12B are cross-sectional views showing the main configuration of the display device in FIG. 11 during non-CF color display and CF color display, respectively.
Figure 12B:
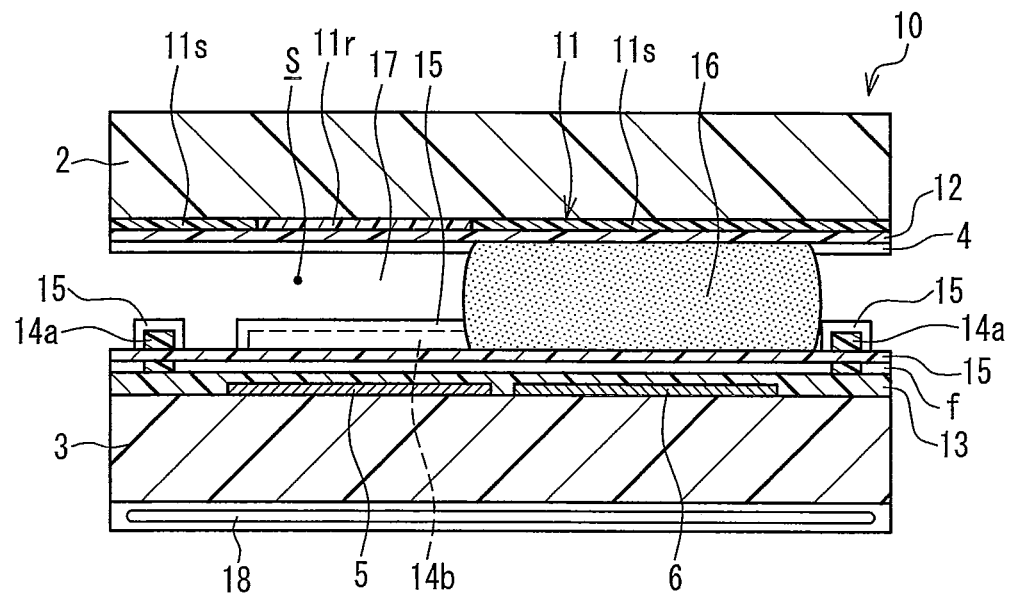

FIG. 11 is an enlarged plan view showing the main configuration of the lower substrate of a display device of Embodiment 2 of the present invention when viewed from the non-display surface side. FIGS. 12A and 12B are cross-sectional views showing the main configuration of the display device in FIG. 11 during non-CF color display and CF color display, respectively. In the figures, this embodiment differs from Embodiment 1 mainly in that a plurality of electrode members are provided in the display space so as to sandwich each of the pixel regions. The same components as those of Embodiment 1 are denoted by the same reference numerals, and the explanation will not be repeated.

As shown in FIG. 11, in this embodiment, the pixel regions P are separated from one another by the ribs 14b formed parallel to the X direction and the ribs 14a formed parallel to the Y direction. In each of the pixel regions P, two electrode members f are provided in the display space S so as to sandwich the pixel region P. Specifically, the electrode members f are formed on the dielectric layer 13 so that each of them is located in a gap between the ribs 14a and 14b in the Y direction, and are arranged parallel to the longitudinal direction (X direction) of the pixel regions P.

In the display device 10 of this embodiment, as shown in FIG. 12A, when the conductive liquid 16 is held between the color filter 11r and the reference electrode 5, the light from the backlight 18 is blocked by the conductive liquid 16, so that the black display (non-CF color display) is performed. On the other hand, as shown in FIG. 12B, when the conductive liquid 16 is held between the black matrix 11s and the scanning electrode 6, the light from the backlight 19 is not blocked by the conductive liquid 16 and passes through the color filter 11r, so that the red display (CF color display) is performed.

With the above configuration, this embodiment can have effects comparable to those of Embodiment 1. Moreover, since two electrode members f are provided in the display space S so as to sandwich the pixel region P, this embodiment can ensure that the conductive liquid 16 is filled into the pixel region P.

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion that can display color images. However, the present invention is not limited thereto, as long as it is applied to an electric apparatus with a display portion that displays the information including characters and images. For example, the present invention is suitable for various electric apparatuses with display portions such as a personal digital assistant such as an electronic organizer, a display apparatus for a personal computer or television, and an electronic paper.

In the above description, the electrowetting-type display device is used, in which the conductive liquid is moved in accordance with the application of an electric field to the conductive liquid. However, the display device of the present invention is not limited thereto, as long as it is an electric-field-induced display device that can change the display color on the display surface by moving the conductive liquid in the display space with the use of an external electric field. For example, the present invention can be applied to other types of electric-field-induced display devices such as an electroosmotic type, an electrophoretic type, and a dielectrophoretic type.

As described in each of the above embodiments, the electrowetting-type display device is preferred because the conductive liquid can be moved at a high speed and a low drive voltage. Moreover, since three different electrodes are used to move the conductive liquid slidably, the electrowetting-type display device can achieve both a high switching speed of the display color on the display surface and electric power saving more easily than the display device in which the shape of the conductive liquid is changed. In the electrowetting-type display device, the display color is changed with the movement of the conductive liquid. Therefore, unlike a liquid crystal display apparatus or the like, there is no viewing angle dependence. Moreover, since a switching device does not need to be provided for each pixel, a high-performance matrix-driven display device having a simple structure can be achieved at a low cost. Further, the electrowetting-type display device does not use a birefringent material such as a liquid crystal layer. Therefore, it is possible to easily provide a high brightness display device with excellent utilization efficiency of light from the backlight or ambient light used for information display.

The above description refers to the transmission type display device including a backlight. However, the present invention is not limited thereto, and may be applied to a reflection type display device including a light reflection portion such as a diffuse reflection plate, a semi-transmission type display device including the light reflection portion along with a backlight, or the like.

In the above description, the signal electrodes (first electrodes) are provided on the upper substrate (first substrate) and the reference electrodes (second electrodes) and the scanning electrodes (third electrodes) are provided on the lower substrate (second substrate). However, in the present invention, the number and locations of the electrodes are not limited to the above, as long as the electrode members for filling the conductive liquid are provided in the display space and configured so that a predetermined voltage can be applied thereto, and the conductive liquid is filled into the display space by applying the predetermined voltage to the electrode members. Specifically, e.g., the first electrodes may be provided on the second substrate or on the ribs, and the second electrodes and the third electrodes may be provided on the first substrate.

In the above description, the reference electrodes (second electrodes) and the scanning electrodes (third electrodes) are located on the effective display region side and the non-effective display region side, respectively. However, the present invention is not limited thereto, and the second electrodes and the third electrodes may be located on the non-effective display region side and the effective display region side, respectively.

In the above description, the reference electrodes (second electrodes) and the scanning electrodes (third electrodes) are provided on the surface of the lower substrate (second substrate) that faces the display surface side. However, the present invention is not limited thereto, and can use the second electrodes and the third electrodes that are buried in the second substrate made of an insulating material. In this case, the second substrate also can serve as a dielectric layer, which can eliminate the formation of the dielectric layer. Moreover, the first electrodes may be directly provided on the first and second substrates serving as dielectric layers, and thus may be placed in the display space.

In the above description, the reference electrodes (second electrodes) and the scanning electrodes (third electrodes) are made of transparent electrode materials. However, the present invention is not limited thereto, as long as either one of the second electrodes and the third electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the reference electrodes (second electrodes) and the scanning electrodes (third electrodes) are in the form of stripes. However, the shapes of the second electrodes and the third electrodes of the present invention are not limited thereto. For example, the reflection type display device may use linear or mesh electrodes that are not likely to cause a light loss, since the utilization efficiency of light used for information display is lower in the reflection type display device than in the transmission type display device.

In the above description, the signal electrodes (first electrodes) are linear wiring. However, the first electrodes of the present invention are not limited thereto, and can be wiring with other shapes such as mesh wiring.

As described in each of the above embodiments, it is preferable that the shape of the first electrodes is determined using the transmittance of the second electrodes and the third electrodes that are transparent electrodes. This is because even if the first electrodes are made of an opaque material, shadows of the first electrodes can be prevented from appearing on the display surface, and thus a decrease in display quality can be suppressed. The use of the linear wiring is more preferred because the decrease in display quality can be reliably suppressed.

In the above description, the conductive liquid is a potassium chloride aqueous solution, and the signal electrodes (first electrodes) include at least one of gold, silver, copper, platinum, and palladium. However, the present invention is not limited thereto, as long as a material that is electrochemically inert to the conductive liquid is used for the first electrodes that are placed in the display space and come into contact with the conductive liquid. Specifically, the conductive liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The conductive liquid of the present invention also can be an ionic liquid (room temperature molten salt) including pyridine-, alicyclic amine-, or aliphatic amine-based cations and fluorine anions such as fluoride ions or triflate.

As described in each of the above embodiments, the aqueous solution in which a predetermined electrolyte is dissolved is preferred for the conductive liquid because the display device can have excellent handling properties and also be easily produced.

The signal electrodes (first electrodes) and the electrode members of the present invention may be in the passive state including an electrode body composed of a conductive metal such as aluminum, nickel, iron, cobalt, chromium, titanium, tantalum, niobium, or an alloy thereof and an oxide film disposed to cover the surface of the electrode body.

As described in each of the above embodiments, the first electrodes and the electrode members including at least one of gold, silver, copper, platinum, and palladium are preferred because these metals have a low ionization tendency and make it possible not only to simplify the signal electrodes, but also to reliably prevent an electrochemical reaction between the signal electrodes and the conductive liquid. Thus, the display device can easily prevent a reduction in the reliability and have a long life. Moreover, with the use of the metals having a low ionization tendency, the interfacial tension at the interface between the signal electrodes and the conductive liquid can be relatively small. Therefore, when the conductive liquid is not moved, it can be easily held in a stable state at the fixed position.

In the above description, the nonpolar oil is used. However, the present invention is not limited thereto. For example, air may be used instead of the oil, as long as it is an insulating fluid that is not mixed with the conductive liquid. Moreover, silicone oil or an aliphatic hydrocarbon also can be used as the oil.

As described in each of the above embodiments, the nonpolar oil that is not compatible with the conductive liquid is preferred because the droplets of the conductive liquid move more easily in the nonpolar oil compared to the use of air and the conductive liquid. Consequently, the conductive liquid can be moved at a high speed, and the display color can be switched at a high speed.

In the above description, the black colored conductive liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the conductive liquids with different colors such as RGB, CMY composed of cyan (C), magenta (M), and yellow (Y), or RGBYC also can be used.

In the above description, the color filter layer is formed on the surface of the upper substrate (first substrate) that faces the non-display surface side. However, the present invention is not limited thereto, and the color filter layer may be formed on the surface of the first substrate that faces the display surface side or on the lower substrate (second substrate). Thus, the color filter layer is preferred compared to the use of the conductive liquids with different colors because the display device can be easily produced. Moreover, the color filter layer is also preferred because the effective display region and the non-effective display region can be properly and reliably defined with respect to the display space by the color filter (aperture) and the black matrix (light-shielding layer) included in the color filter layer, respectively.

INDUSTRIAL APPLICABILITY

The present invention is useful for a display device that has high productivity and allows the conductive liquid to be easily filled into the display space, and a method for manufacturing the display device.

The invention claimed is:

1. A display device that comprises a first substrate provided on a display surface side, a second substrate provided on a non-display surface side of the first substrate so that a predetermined display space is formed between the first substrate and the second substrate, and a conductive liquid movably sealed in the display space, and that is capable of changing a display color on the display surface side by moving the conductive liquid, wherein an electrode member for filling the conductive liquid is provided in the display space and configured so that a predetermined voltage can be applied thereto, and the electrode member is configured so as not to contribute to the movement of the conductive liquid, and the conductive liquid is filled into the display space by applying the predetermined voltage to the electrode member.

2. The display device according to claim 1, wherein an electrode for moving the conductive liquid in the display space is provided on one of the first substrate and the second substrate so as to be electrically insulated from the conductive liquid and the electrode member, and the conductive liquid is filled into the display space by applying the predetermined voltage to the electrode member so that a predetermined potential difference occurs between the electrode member and the electrode.

3. The display device according to claim 1, wherein a plurality of first electrodes are provided on one of the first substrate and the second substrate along a predetermined arrangement direction, and
a plurality of second electrodes and a plurality of third electrodes are provided on the other of the first substrate and the second substrate and are alternately arranged so as to intersect with the plurality of the first electrodes, and
wherein the plurality of the first electrodes are used as a plurality of signal electrodes,
the plurality of the second electrodes are used as one of a plurality of reference electrodes and a plurality of scanning electrodes, and
the plurality of the third electrodes are used as the other of the plurality of the reference electrodes and the plurality of the scanning electrodes, and
wherein the display device comprises:
a reference voltage application portion that is connected to the plurality of the reference electrodes and applies a predetermined reference voltage to each of the reference electrodes;
a signal voltage application portion that is connected to the plurality of the signal electrodes and applies a signal voltage to each of the signal electrodes in accordance with information to be displayed on the display surface side; and
a scanning voltage application portion that is connected to the plurality of the scanning electrodes and applies one of a non-selected voltage and a selected voltage to each of the scanning electrodes while the reference voltage application portion applies the reference voltage to each of the reference electrodes, the non-selected voltage inhibiting a movement of the conductive liquid in the display space and the selected voltage allowing the conductive liquid to move in the display space in accordance with the signal voltage.

4. The display device according to claim 3, wherein a plurality of pixel regions are provided on the display surface side,
the plurality of the pixel regions are located at each of the intersections of the signal electrodes and the scanning electrodes, and
the display space in each of the pixel regions is partitioned by a partition.

5. The display device according to claim 4, wherein the plurality of the pixel regions are provided in accordance with a plurality of colors that enable full-color display to be shown on the display surface side.

6. The display device according to claim 5, wherein a plurality of the electrode members are provided in the display space so as to sandwich each of the pixel regions.

7. The display device according to claim 5, wherein the plurality of the electrode members are provided in the display space in a direction parallel to a longitudinal direction of the pixel regions.

8. The display device according to claim 5, wherein the conductive liquid is filled into each of the pixel regions by applying a predetermined voltage to the electrode members so that a predetermined potential difference occurs between the electrode members and at least one of the reference electrodes and the scanning electrodes.

9. The display device according to claim 5, wherein a dielectric layer is formed on the surfaces of the reference electrodes and the scanning electrodes.

10. The display device according to claim 4, wherein a plurality of the electrode members are provided in the display space so as to sandwich each of the pixel regions.

11. The display device according to claim 10, wherein the plurality of the electrode members are provided in the display space in a direction parallel to a longitudinal direction of the pixel regions.

12. The display device according to claim 10, wherein the conductive liquid is filled into each of the pixel regions by applying a predetermined voltage to the electrode members so that a predetermined potential difference occurs between the electrode members and at least one of the reference electrodes and the scanning electrodes.

13. The display device according to claim 4, wherein the plurality of the electrode members are provided in the display space in a direction parallel to a longitudinal direction of the pixel regions.

14. The display device according to claim 13, wherein the conductive liquid is filled into each of the pixel regions by applying a predetermined voltage to the electrode members so that a predetermined potential difference occurs between the electrode members and at least one of the reference electrodes and the scanning electrodes.

15. The display device according to claim 4, wherein the conductive liquid is filled into each of the pixel regions by applying a predetermined voltage to the electrode members so that a predetermined potential difference occurs between the electrode members and at least one of the reference electrodes and the scanning electrodes.

16. The display device according to claim 4, wherein a dielectric layer is formed on the surfaces of the reference electrodes and the scanning electrodes.

17. The display device according to claim 3, wherein a dielectric layer is formed on the surfaces of the reference electrodes and the scanning electrodes.

18. The display device according to claim 1, wherein an insulating fluid that is not mixed with the conductive liquid is movably sealed in the display space.

19. A method for manufacturing a display device that comprises a first substrate provided on a display surface side, a second substrate provided on a non-display surface side of the first substrate so that a predetermined display space is formed between the first substrate and the second substrate, and a conductive liquid movably sealed in the display space, and that is capable of changing a display color on the display surface side by moving the conductive liquid,
the method comprising:
a step of forming an electrode for moving the conductive liquid in the display space on one of the first substrate and the second substrate;
a step of disposing an electrode member for filling the conductive liquid, the electrode member being electrically insulated from the electrode and configured so that a predetermined voltage can be applied thereto; and
a step of filling the conductive liquid in the display space onto one of the first substrate and the second substrate while applying a predetermined voltage to the electrode member so that a predetermined potential difference occurs between the electrode member and the electrode.

20. The method according to claim 19, comprising:
a step of forming partitions for partitioning the display space on one of the first substrate and the second substrate in accordance with a plurality of pixel regions provided on the display surface side after the step of forming the electrode, wherein the electrode member is disposed parallel to a longitudinal direction of the pixel regions in the step of disposing the electrode member, and
the conductive liquid is filled in each of the pixel regions on one of the first substrate and the second substrate in the step of filling the conductive liquid.

* * * * *